1. United States Patent
Dho

(10) Patent No.: US 6,819,468 B2
(45) Date of Patent: Nov. 16, 2004

(54) IMAGE PROJECTION APPARATUS AND METHOD

(75) Inventor: Sang-whoe Dho, Suwon (KR)

(73) Assignee: Samsung Electronics Co., Ltd., Gyunggi-Do (KR)

( * ) Notice: Subject to any disclaimer, the term of this patent is extended or adjusted under 35 U.S.C. 154(b) by 24 days.

(21) Appl. No.: 10/283,289

(22) Filed: Oct. 30, 2002

(65) Prior Publication Data

US 2003/0107817 A1 Jun. 12, 2003

(30) Foreign Application Priority Data

Dec. 8, 2001 (KR) ........................................ 2001-77650

(51) Int. Cl.[7] ............................ G02F 1/01; G03B 21/26; B41J 2/47; H04N 5/74
(52) U.S. Cl. ......................... 359/279; 353/34; 347/239; 348/756
(58) Field of Search ................................ 359/230, 237, 359/238, 245, 279, 291, 316, 634, 223, 224, 292, 298; 353/31, 34, 84, 50, 98; 347/239, 255; 348/750, 756, 759, 760, 764, 771; 355/67

(56) References Cited

U.S. PATENT DOCUMENTS 6,219,110 B1 * 4/2001 Ishikawa et al. ............. 348/759
2002/0054423 A1 * 5/2002 Kurematsu .................. 359/291

* cited by examiner

Primary Examiner—Georgia Epps
Assistant Examiner—William Choi
(74) Attorney, Agent, or Firm—Sughrue Mion, PLLC

(57) ABSTRACT

An image projection apparatus and method includes a light separating unit that separates white light into monochromatic lights of different wavelengths, and then forms a plurality of monochromatic color stripes. A galvanometer receives the separated monochromatic lights and deflects the lights by a predetermined angle. The holographic optical element such as a hologram element can be used as the light separating unit, obtaining an advantageous reduction in light loss. Further, when the separated RGB monochromatic lights are scanned on the DMD panel by the use of galvanometer, only one color stripe is projected to be incident on the DMD panel in the initial scanning, thereby increasing light utilization efficiency. As a result, the quantity of light increases, the light efficiency improves, and the brightness of the realized image is enhanced.

12 Claims, 6 Drawing Sheets

IMAGE PROJECTION APPARATUS AND METHOD

BACKGROUND OF THE INVENTION

1. Field of the Invention

The present invention generally relates to an image projection apparatus and method, and more particularly, it relates to an image projection apparatus and method for projecting red (R), green (G), and blue (B) beams separated from a holographic optical element onto a screen by using a galvanometer. The present application is based on Korean Application No. 2001-77650, filed on Dec. 8, 2001, which is incorporated herein by reference.

2. Description of the Prior Art

Display apparatuses like projectors and projection systems display an image by projecting the received image signals onto a screen. Such display apparatuses are widely used, for example, in business meetings, movie theaters and home theaters.

Conventionally, images appearing on a liquid crystal display (LCD) or a cathode ray tube (CRT) are magnified by a lens and then projected onto a screen. As this approach only magnifies the images, it cannot provide a good quality image. In order to alleviate this drawback, an image projection apparatus having a digital micromirror device (DMD) panel is used.

The DMD is a semiconductor optical switch using a micromirror. The micromirror regulates the reflection of light in accordance with the input image signals. The DMD provides advantages such as excellent color representation and high light intensity. Further, as there is no need for analogue-to-digital or digital-to-analogue conversion, a relatively clear image can be obtained. Additionally, as there is no loss of light due to a polarizing filter, the DMD can obtain high optical output.

FIG. 1 shows the basic structure of a conventional image projection apparatus using a color wheel.

Referring to FIG. 1, the conventional image projection apparatus 100 using a color wheel includes a light source 110, a color wheel 120, a DMD panel 130 and a projection lens 140. The optical path of the white light is indicated by the one-dotted line in FIG. 1.

The light source 110 irradiates white light using, for example, an arc lamp or a laser beam. The color wheel 120 is rotated by a separate rotating means (in the direction of the two arrows), and is subdivided into red (R), green (G) and blue (B) regions.

White light from the light source 110 is subdivided into RGB beams by the RGB regions.

The DMD panel 130 has a plurality of micromirrors 130a. Divided by respective wave lengths, the RGB beams are projected onto the DMD panel 130 and deflected from the micromirrors 130a. The deflected RGB beams pass through the projection lens 140, and are displayed on the screen as an image.

However, in the conventional image projection apparatus 100, G and B beams are absorbed or reflected in the R region, while the R beam is passed therethrough. The same phenomenon is found in the G and B regions corresponding to the G and B beams. Accordingly, only a third of the white light can be utilized by the color wheel method, which results in a deterioration of brightness of the image by two thirds.

In other words, when using the color wheel 120 for colorization, white light from the light source 110 loses light quantity while passing through the color wheel 120. Accordingly, light efficiency deteriorates, and maximization of the brightness of the image on the screen cannot be expected.

SUMMARY OF THE INVENTION

Accordingly, it is an aspect of the present invention to provide an image projection apparatus for realizing an image by scanning a monochromatic light separated from a holographic optical element with a galvanometer.

The above aspect is accomplished by an image projection apparatus and method according to the present invention, including a light source for irradiating a white light; a light separating unit for separating the white light into monochromatic lights of different wavelengths, and forming a plurality of monochromatic color stripes; a galvanometer for reflecting the plurality of monochromatic color stripes by a predetermined angle; a digital micromirror device (DMD) panel for receiving the reflected monochromatic color stripes, transforming the received monochromatic color stripes, and reflecting the transformed stripes by a predetermined angle; and a projection lens disposed opposite to the DMD panel.

The light separating unit includes a square beam generating unit for transforming the white light into a square beam; a linear beam generating unit for transforming the generated square beam into a linear beam; and a color separating unit for separating the generated linear beam into the plurality of monochromatic color stripes.

The linear beam generating unit comprises a cylindrical lens that linearizes the square beam. The color separating unit comprises a holographic optical element that separates the linear beam into red, green and blue stripes.

The galvanometer includes a reflective mirror having one reflective surface; and a driving unit for driving the reflective mirror so that the reflective mirror oscillates between a first position and a second position. The reflective mirror in the first position projects one or more monochromatic color stripes to an upper end of the DMD panel, and the reflective mirror in the second position projects one or more monochromatic color stripes to a lower end of the DMD panel.

The reflective mirror reciprocally oscillates between the first and second positions by the driving unit at least once, realizing a down-scanning screen by oscillating from the first position to the second position, and realizing an upscanning screen by oscillating from the second position to the first position. The projection lens concentrates the incident light from the DMD panel, and projects the concentrated light to a display device.

Additionally, it is an aspect of the present invention to provide an image projection method for realizing an image by irradiating a white light. The white light is then separated into a plurality of monochromatic lights of different wavelengths, whereby a plurality of monochromatic color stripes are formed from the monochromatic lights. The image projection method further includes reflecting the plurality of monochromatic color stripes by a predetermined angle, receiving the reflected monochromatic color stripes, and transforming the received monochromatic color stripes. The transformed stripes are then reflected by a predetermined angle, wherein a projected image is realized by a projection lens disposed opposite to a digital micromirror device (DMD) panel.

In accordance with the present invention, the quantity of light increases, the light efficiency improves, and the brightness of the realized image is enhanced.

BRIEF DESCRIPTION OF THE DRAWINGS

The above-mentioned aspects and features of the present invention will be more readily apparent from the description of the illustrative, non-limiting embodiments of the present invention and by reference to the appended drawings, in which.

DETAILED DESCRIPTION OF THE ILLUSTRATIVE, NON-LIMITING EMBODIMENTS

Hereinafter, the illustrative, non-limiting embodiments of the present invention will be described in greater detail with reference to the accompanying drawings.

Figure 1:
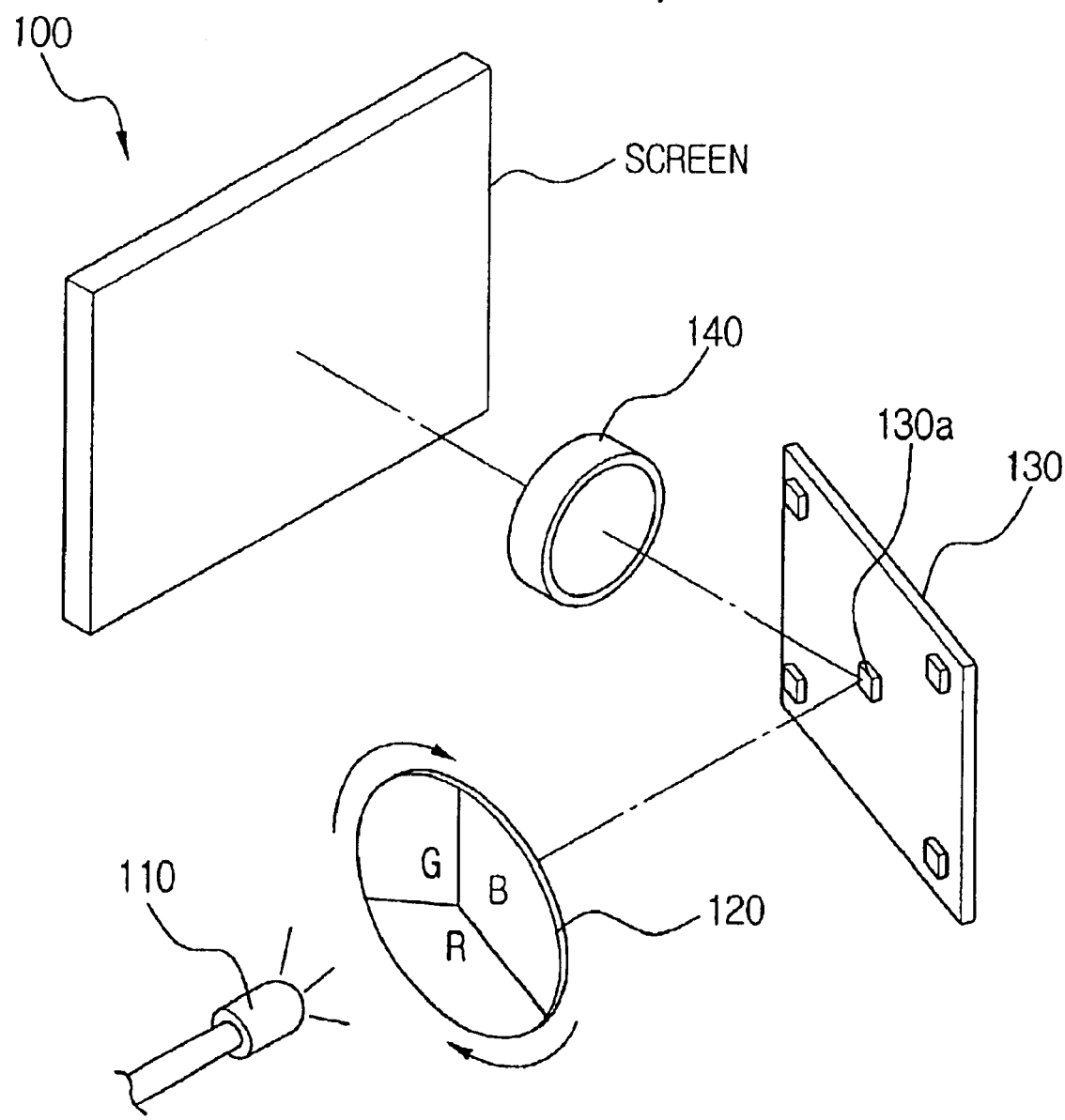
FIG. 1 is a view showing the basic structure of a conventional image projection apparatus using a color wheel.
Figure 2:
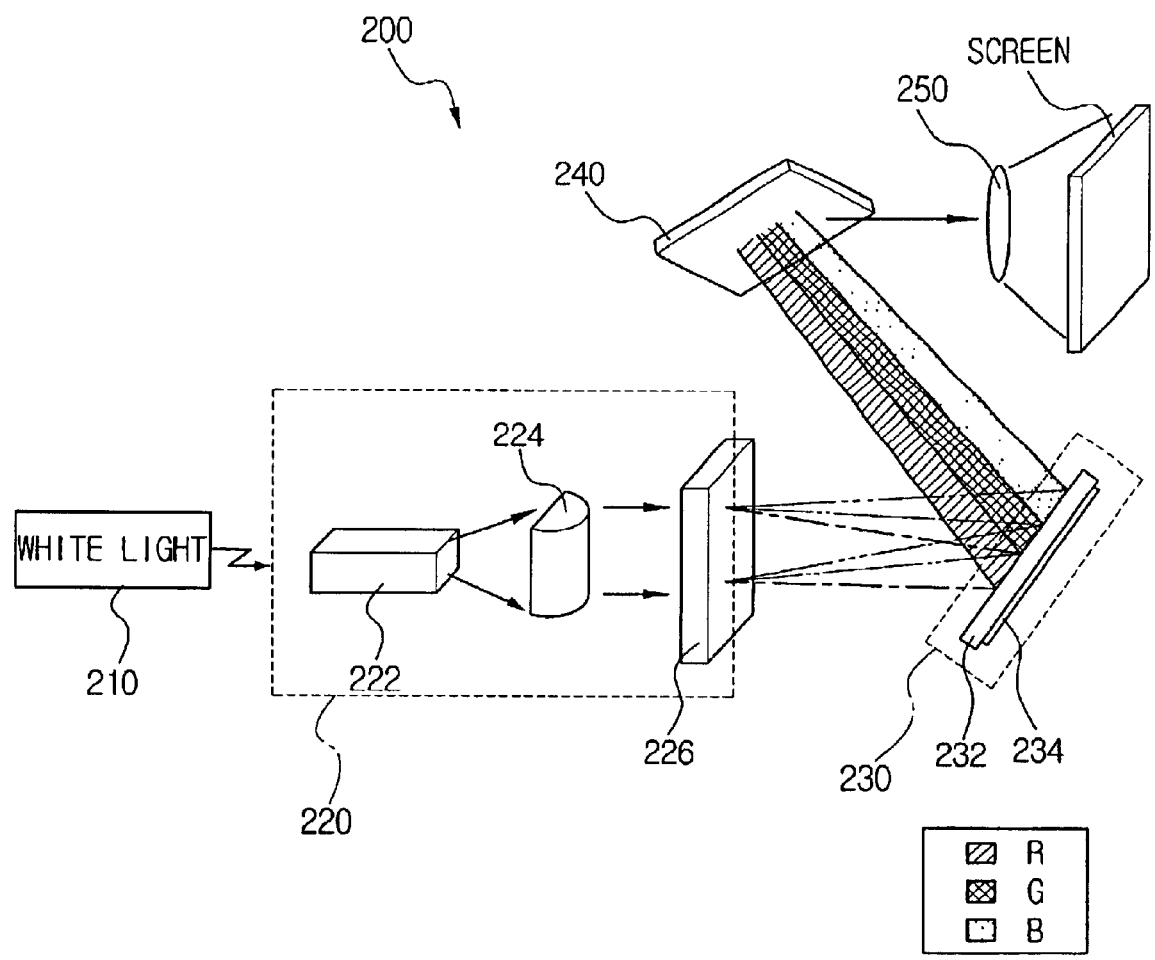
FIG. 2 is a view schematically showing an image projection apparatus according to an illustrative, non-limiting embodiment of the present invention.

Referring to FIG. 2, the image projection apparatus 200 according to the present invention includes a light source 210, a light separator 220, a galvanometer 230, a DMD panel 240 and a projection lens 250.

The light source 210 irradiates white light, or a laser beam, inclusive of red, green and blue lights. For example, a laser, a metal halide lamp, a halogen lamp or a xenon lamp can be used as the light source 210.

The light separator 220 includes a square beam generating unit 222, a linear beam generating unit 224 and a color separating unit 226. The square beam generating unit 222 converts incident white light into equal square beams with, for example, a light tube. The light tube has a hollow hexahedron shape. Four inner sides of the light tube are mirrored. White light incident in the interior of the hollow light tube is output as a square beam.

The linear beam generating unit 224 converts the square beam into a linear beam. The linear beam generating unit 224 uses a cylindrical lens having a semi-cylindrical shape.

The color separating unit 226 separates and outputs the linear beam from the linear beam generating unit 224 into RGB monochromatic lights of different wavelengths. In FIG. 2, the optical path of the R monochromatic light is indicated by the one-dotted line, that of the G monochromatic light by the two-dotted line, and that of the B monochromatic light by the three-dotted line.

The RGB monochromatic lights produce RGB monochromatic bands (hereinafter called color stripes) in the galvanometer 230. In FIG. 2, the R color stripe is indicated by hatching, the G color stripe by grid and the B color stripe by dots. The color separating unit 226 uses either a hologram element or a grating element. The hologram element used in the optics is called holographic optical element (HOE).

The color separating unit 226 is constructed by general grating, lens, mirror and optical filter through application of holography technology. It enables mass production of the color separating unit 226 at a reasonable price. Also, as a single element can serve multiple functions at a time, the color separating unit 226 can be applied in various fields.

Usually, the color separating unit 226 can substitute the grating, lens, mirror and optical filter in the optical system using a light source of narrow bandpass or a monochromatic light source such as laser, LED, or the like.

The galvanometer 230 reflects the RGB stripes on the DMD panel 240, thereby performing the scanning sequentially. The galvanometer 230 includes a reflective mirror 232 and a driving unit 234.

The reflective mirror 232 is a galvano-mirror measuring from 1 cm to 2 cm in size. The reflective mirror 232 oscillates between a first position and a second position. In the first position, the reflective mirror projects one or more of the RGB stripes onto an upper end of the DMD panel 240. In the second position, the reflective mirror 232 projects one or more of the RGB stripes onto a lower end of the DMD panel 240.

In other words, the reflective mirror 232 is moved between the first and second positions by a magnetic force from the driving unit 234, reflecting monochromatic light corresponding to RGB stripes.

The DMD panel 240 transforms the RGB monochromatic lights reflected from the galvanometer 230 into image signals, and reflects the image signals. Accordingly, the projection lens 250 projects the reflected laser beams in order, thereby realizing an image on the screen.

According to another illustrative, non-limiting embodiment of the present invention, an LCD can be used instead of the DMD panel 240. While the DMD panel 240 is a reflective panel, the LCD panel is a permeate panel. With the LCD panel, the position of the projection lens and screen varies. The position of the projection lens with the use of the reflective panel is as shown in FIG. 2. With the permeate lens, the projection lens is positioned opposite to the light incident direction.

Figure 3A:
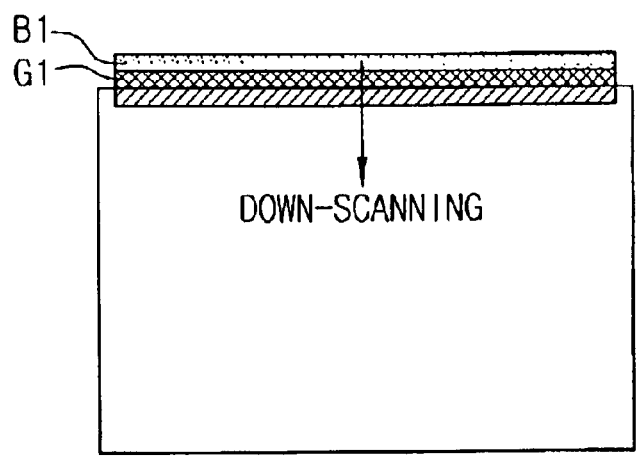
FIGS. 3A through 3F are views for explaining a galvanometer scanning method according to FIG. 2.
Figure 3B:
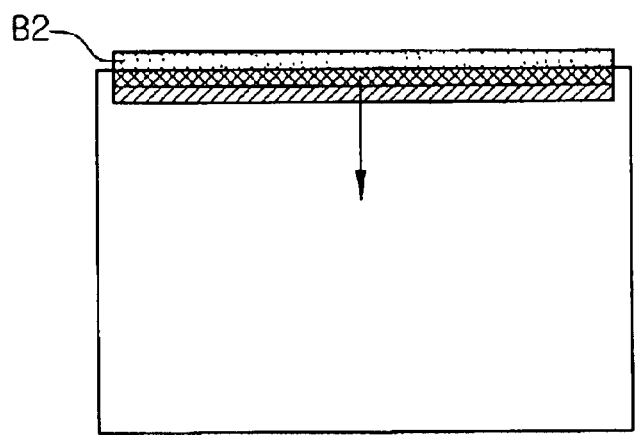
Figure 3C:
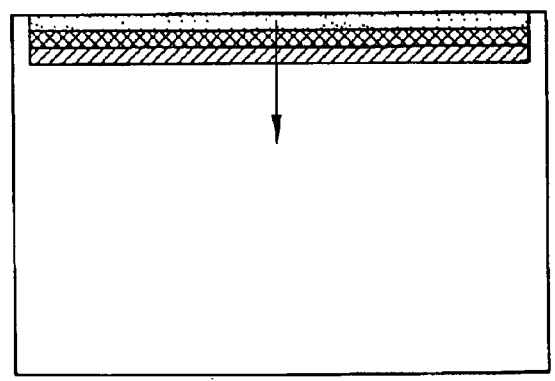
Figure 3D:
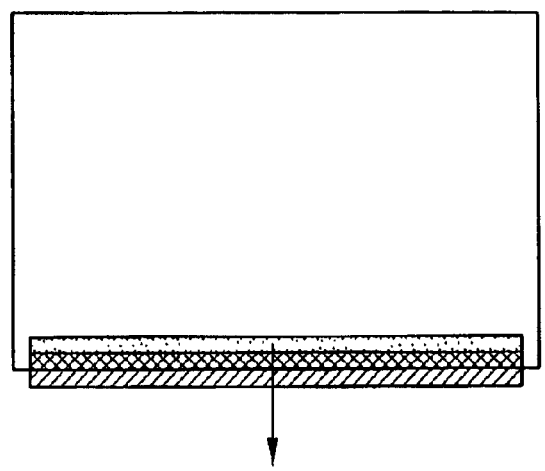
Figure 3E:
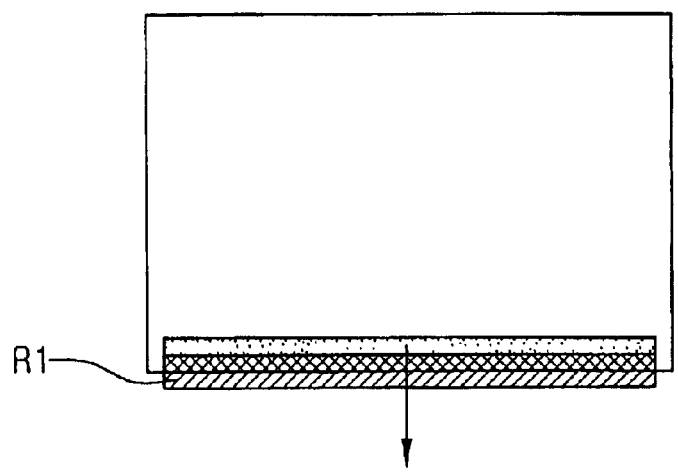
Figure 3F:
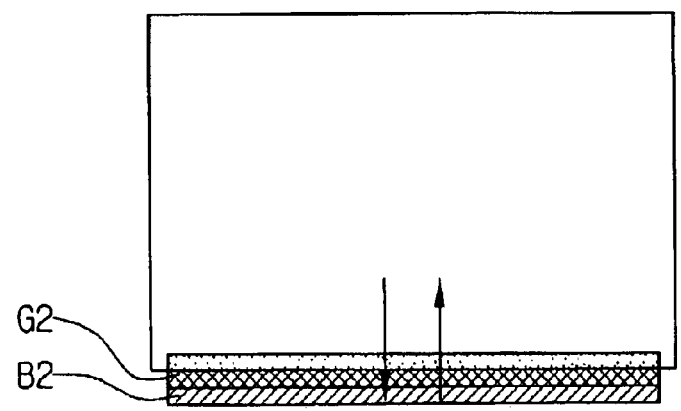
Figure 4:
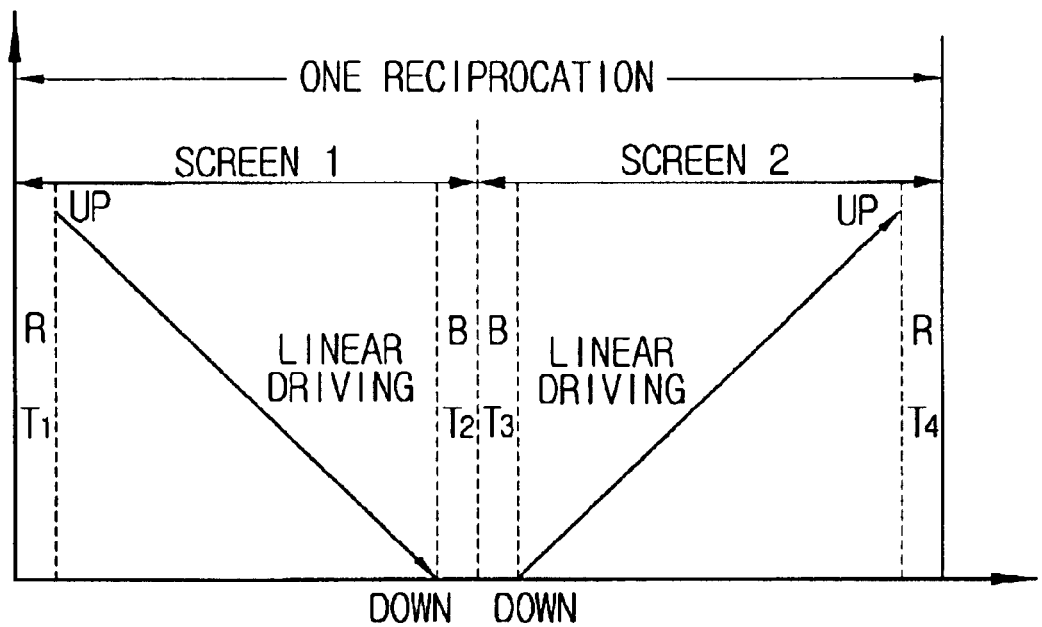
FIG. 4 is a view showing processes of realizing screens 1 and 2 on the DMD panel of FIG. 2.

FIGS. 3A through 3F are view for showing the scanning process of the galvanometer 230, and FIG. 4 is a view showing the realization of screens 1 and 2 on the DMD panel.

Referring to FIGS. 3A through 3F, and FIG. 4, the galvanometer 230 projects one of the RGB stripes onto the DMD panel 240 in the initial scanning, and scans the separated RGB stripes onto the DMD panel 240 in a certain order.

For example, with the R stripe incident on the DMD panel 240 in the initial scanning, the galvanometer 230 scans the G stripe according to driving signals from the driving unit 234 if the R stripe is displayed for a predetermined time (see FIG. 3A). If the scanned G stripe is displayed for the width of the G stripe (see FIG. 3B), the galvanometer 230 scans the B stripe. The scanned B stripe is displayed for the width of the B stripe (see FIG. 3C).

With one down-scanning of the galvanometer 230 through the steps of FIGS. 3A through 3F, one screen is produced (see FIG. 3F). In other words, with the galvanometer 230 downwardly scanning the RGB stripes of the DMD panel 240 more than once in order, the down-scanning screen is produced.

At this time, more than one RGB stripes are scanned in the DMD panel 240. When the stripes are scanned in the order of R, G and B, the firstly-incident R stripe is realized on the DMD panel 240 for a width of the R stripe for, as shown in FIG. 4, a time T1. Accordingly, after time T1 passes, the driving unit 234 of the galvanometer 230 sends linear driving signals, thereby downwardly scanning RGB stripes on the DMD panel 240.

In the case that each of the RGB stripes is scanned on the DMD panel 240 once, the galvanometer 230 stops operation after the scanning of the B stripe. When the B stripe is displayed for the width of B stripe for the time T2, the down-scanned screen 1 is ended (see FIG. 3F).

One screen is also completed with one up-scanning of the galvanometer 230. In other words, one up-scanning screen is realized as the galvanometer 230 scans the RGB stripes on the DMD panel 240 in order more than once.

The B stripe, which is the last stripe to be realized on the screen 1, is realized for the width of the B stripe for a time T3. After the time T3 passes, the driving unit 234 of the galvanometer 230 sends linear driving signals, thereby upwardly scanning the RGB stripes on the DMD panel 240.

When each of the RGB stripes is scanned on the DMD panel 240, the galvanometer 230 stops operation after the scanning of the R stripe. Also, when the R stripe is displayed for the width of the R stripe for the time T4, the upscanning screen 2 is ended. As the galvanometer 230 reciprocates 30 times per second, 60 sheets of images can be realized for one second.

Figure 5:
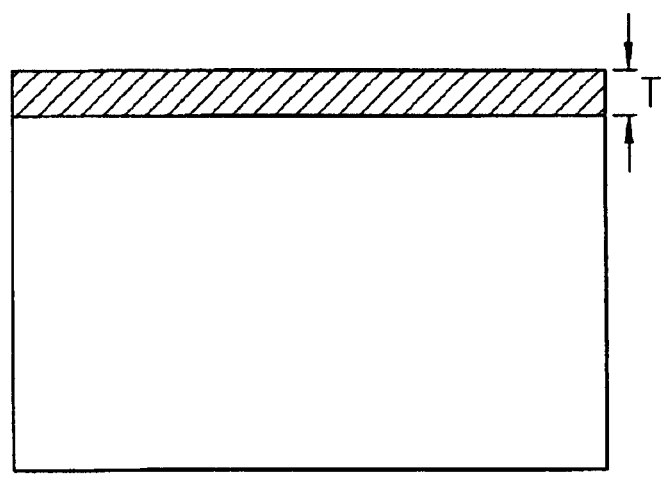
FIG. 5 is a view showing the determination of grayscale according to an illustrative, non-limiting embodiment of the present invention.

FIG. 5 is a view showing the determination of the grayscale of FIG. 2 according to an illustrative, non-limiting embodiment of the present invention.

The grayscale converts RGB monochromatic lights into gray images. According to the brightness of the RGB monochromatic lights, the RGB monochromatic lights are converted to gray color.

Referring to FIG. 5, the grayscale is determined for respective steps by dividing the time T taken for realizing the R stripe for the width of the R stripe on the DMD panel 240. Image quality deterioration is least when the width of the RGB stripes are equal.

Figure 6A:
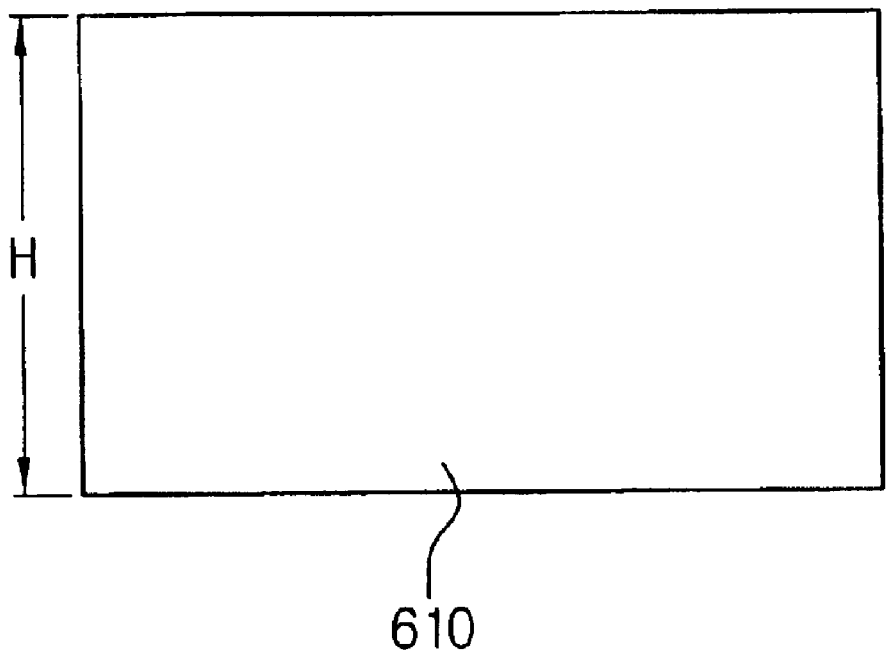
FIGS. 6A and 6B are views illustrating a light utilization efficiency according to FIG. 2.
Figure 6B:
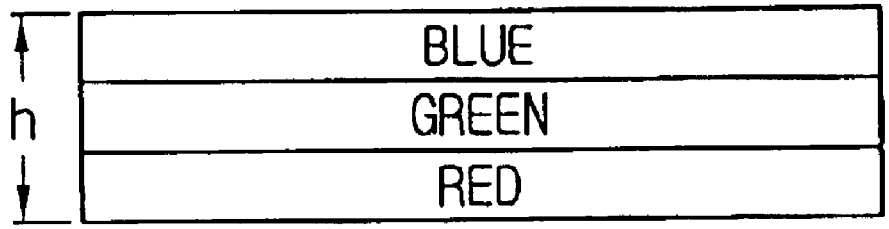

FIGS. 6A and 6B are views for showing light utilization efficiency according to the present invention.

Referring to FIGS. 6A and 6B, H denotes a vertical length of the DMD panel 610, and h denotes vertical length of the RGB monochromatic stripes. When the respective RGB stripes are scanned once on the DMD panel 610, N equals 1.

Referring to FIGS. 3A through 3F, in addition to N, $N_{total}$ requires one RGB stripe by B1+G1+R1, and another RGB stripe by B2+G2+R2. In other words, $N_{total}$=N+2.

Light utilization efficiency of RGB monochromatic light in one screen F is derived from the following equation:

$$F = \frac{N}{N_{total}} = \frac{N}{N+2} = 1 - \frac{2}{N+2} \quad \text{[Equation 1]}$$

For example, when N=1, F=1−2/(1+2)=1/3. This obtains the same light efficiency as obtained by the color filter method that sequentially selects and processes the RGB monochromatic lights. When N=4, F=1−2/(4+2)=2/3, with the light utilization efficiency two times as high as the efficiency obtained when N=1. Further when N=98, light utilization efficiency of F=1−2(98+2)=0.98 is obtained. N≧2, and light utilization efficiency more improves with greater N.

By the image projection apparatus according to the present invention, white light is separated into RGB monochromatic lights of different wavelengths without loss of light quantity through the use of a holographic optical element (HOE).

Further, when the respective color stripes are formed with respect to the separated RGB monochromatic lights, and scanned on the DMD panel by the use of galvanometer, only one color stripe is projected to be incident on the DMD panel in the initial scanning, increasing light utilization efficiency. As a result, the quantity of light increases, the light efficiency improves, and the brightness of the realized image is enhanced.

Although the illustrative, non-limiting embodiments of the present invention have been described, it will be understood by those skilled in the art that the present invention should not be limited to the described illustrative, non-limiting embodiments, but various changes and modifications can be made within the spirit and scope of the present invention as defined by the appended claims.

What is claimed is:

1. An image projection apparatus, comprising:
   a light source for irradiating a white light;
   a light separating unit for separating the white light into a plurality of monochromatic lights of different wavelengths, and forming a plurality of monochromatic color stripes from the monochromatic lights, said light separating unit comprising:
     a square beam generating unit for transforming the white light into a square beam;
     a linear beam generating unit for transforming the generated square beam into a linear beam; and
     a color separating unit for separating the generated linear beam into the plurality of monochromatic color stripes;
   a galvanometer for reflecting the plurality of monochromatic color stripes by a predetermined angle;
   a digital micromirror device (DMD) panel for receiving the reflected monochromatic color stripes, transforming the received monochromatic color stripes, and reflecting the transformed stripes by a predetermined angle; and
   a projection lens disposed opposite to the DMD panel.

2. The image projection apparatus of claim 1, wherein the linear beam generating unit is comprised of a cylindrical lens that linearizes the square beam.

3. The image projection apparatus of claim 1, wherein the color separating unit comprises a holographic optical element that separates the linear beam into red, green and blue stripes.

4. The image projection apparatus of claim 1, wherein the galvanometer comprises:
   a reflective mirror having one reflective surface; and
   a driving unit for driving the reflective mirror so that the reflective mirror oscillates between a first position and a second position, the reflective mirror in the first position projects one or more monochromatic color stripes to an upper end of the DMD panel, and the reflective mirror in the second position projects one or more monochromatic color stripes to a lower end of the DMD panel.

5. The image projection apparatus of claim 4, wherein the reflective mirror reciprocally oscillates in between the first and second positions by the driving unit at least once, realizing a down-scanning screen by oscillating from the first position to the second position, and realizing an upscanning screen by oscillating from the second position to the first position.

6. The image projection apparatus of claim 1, wherein the projection lens concentrates the incident light from the DMD panel, and projects the concentrated light to a display device.

7. An image projection method, comprising:
   irradiating a white light;

transforming the white light into a square beam;

transforming the generated square beam into a linear beam;

separating the generated linear beam into a plurality of monochromatic lights of different wavelengths;

forming a plurality of monochromatic color stripes from the monochromatic lights;

reflecting the plurality of monochromatic color stripes by a predetermined angle;

receiving the reflected monochromatic color stripes;

transforming the received monochromatic color stripes;

reflecting the transformed stripes by a predetermined angle; and disposing a projection lens opposite to a digital micromirror device (DMD) panel.

8. The image projection method of claim 7, further comprising linearizing the square beam, wherein a cylindrical lens is used to linearize the square beam.

9. The image projection method of claim 7, further comprising separating the generated linear beam by a holographic optical element into red, green and blue stripes.

10. The image projection method of claim 7, further comprising driving a reflective mirror having one reflective surface so that the reflective mirror oscillates between a first position and a second position, the reflective mirror in the first position projects one or more monochromatic color stripes to an upper end of the DMD panel, and the reflective mirror in the second position projects one or more monochromatic color stripes to a lower end of the DMD panel, and wherein the plurality of monochromatic color stripes are reflected by a predetermined angle by the reflective mirror.

11. The image projection method of claim 10, wherein the reflective mirror reciprocally oscillates in between the first and second positions by the driving unit at least once, realizing a down-scanning screen by oscillating from the first position to the second position, and realizing an upscanning screen by oscillating from the second position to the first position.

12. The image projection method of claim 7, further comprising:

concentrating incident light from a DMD panel; and projecting the concentrated light to a display device.

\* \* \* \* \*